United States Patent [19]
Westveer

[11] 3,807,454
[45] Apr. 30, 1974

[54] LOW EFFORT PLUNGER

[75] Inventor: Robert C. Westveer, Kalamazoo, Mich.

[73] Assignee: General Signal Corporation, Rochester, N.Y.

[22] Filed: Dec. 15, 1972

[21] Appl. No.: 315,692

[52] U.S. Cl. .......................... 137/625.69, 251/324
[51] Int. Cl. ............................................. F16k 11/07
[58] Field of Search ........ 138/42, 43; 251/126, 282, 251/324; 137/625.6–625.69, 625.48, 625.5

[56] References Cited
UNITED STATES PATENTS

| | | | |
|---|---|---|---|
| 196,489 | 10/1877 | Shepard | 251/126 X |
| 1,820,653 | 8/1931 | Ernst | 137/625.48 |
| 1,964,196 | 6/1934 | Cuttat | 91/421 |
| 2,374,593 | 4/1945 | Ernst et al. | 251/30 X |
| 2,919,679 | 1/1960 | Lincoln et al. | 137/625.68 |
| 3,315,571 | 4/1967 | Hott | 138/43 X |
| 3,460,577 | 8/1969 | Weathers | 137/625.69 |
| 3,476,153 | 11/1969 | Roland | 251/324 X |

FOREIGN PATENTS OR APPLICATIONS 203,307  12/1954  Australia............................ 137/538

Primary Examiner—Henry T. Klinksiek
Attorney, Agent, or Firm—George Vande Sande

[57] ABSTRACT

Low effort in operating fluid flow control valves is achieved by providing at least one groove extending circumferentially around the peripheral surface adjacent to the leading edge of the land of the plunger or spool and/or the stationary land of the housing bore. Preferably, more than one groove, each axially spaced from the other, are provided.

8 Claims, 2 Drawing Figures

PATENTED APR 30 1974 3,807,454

LOW EFFORT PLUNGER

BACKGROUND OF THE INVENTION

This invention relates to spools or plungers of the type employed in fluid flow control valves. More particularly, this invention relates to spools or plungers so designed as to make the control valves in which they are employed operable with less force and with greater precision.

There are many types of mechanical equipment which depend for their efficient operation upon fluid flow control valves. As such equipment becomes larger and more sophisticated, greater demands are placed upon the control valves both with respect to accuracy and ease of operation. In addition, such equipment is usually designed to handle larger loads, thus creating greater forces in the fluid system of the control valves. The greater the forces applied in the fluid system, the more difficult it becomes to provide easy and accurate operation of the valve.

One of the most popular types of fluid flow control valves is that of the hydraulic type which usually includes a reciprocatable plunger or spool mechanism sealingly but slidably engaged within a bore located in the housing of the valve. Along the peripheral length of both the bore and the plunger shaft are provided various lands defined by axially spaced grooved portions such that as the plunger or spool is reciprocated within the bore, different cores or conduits of fluid flow are created which, by their designed direction, regulate the flow of hydraulic fluid for its ultimate use.

One of the problems caused by imposing greater demands upon these valves is the inability to move the plunger or spool a precise distance and/or with ease. This problem is the result of flow forces and increased pressure created in the system as the hydraulic or other fluid passes through the various grooves and over the various lands to its designated termination point. Such flow forces and pressures become increasingly acute as the plunger is moved closer to its "cut-off" position. That is to say, as the plunger is moved such that the leading edge of the plunger land closes upon the leading edge of the static land of the bore (so as to close off the conduit orifice defined thereby) the fluid is forced to flow through an ever narrowing constriction until the cut-off point is actually reached. As is well known in the art, such an ever-narrowing constriction gives rise to flow forces and increased velocities which constitute a combination of static and dynamic imbalances in the system all to the detriment of the ability to control, precisely, further movement of the plunger toward the ultimate cut-off point.

For example, and depending upon the actual design of the plunger and core, the direction in which the fluid is flowing through the ever-narrowing orifice, static and dynamic forces may be set up through or about the orifice so as to create a "hammer effect" whereby the plunger is sucked or pushed to its cut-off point very rapidly, thus tending to hammer the plunger. On the other hand, and again depending upon the described factors of direction of flow and the like, opposing static and dynamic imbalances may be set up which actually prevent the plunger from reaching its cut-off point, e.g. forces created which act directly against further movement of the plunger. In either event, the operator attempting to accurately control the degree to which the plunger is moved incurs some difficulty, often to the point in certain modern large equipment, where a significant challenge is presented to his physical strength and manual endurance. In fact, the static and dynamic imbalances created in such modern equipment are often so high that it becomes necessary in many cases to place a power boost on the control spool. This is, of course, undesirable as in many instances it introduces a quantum increase in costs.

THE PRIOR ART

The prior art has attempted to meet this problem, without the use of expensive power boosts, in several ways. Generally speaking, the most pertinent of these has been to deal with the leading edges of either the plunger lands or the static bore lands in an attempt to linearize (e.g. meter) flow and reduce pressure through the constricting orifice. For example, one known design employs a series of two or more notches extending longitudinally and rearwardly from the leading edge of the lands. Such notches are employed alone or with various undersunk fluid bypasses in an attempt to reduce what is referred to as the Bernoulli forces and thus overcome the hammer effect described above. Another known design uses inclined metering flats and control orifices in the leading edges of the lands to linearize pressure differences. A further known technique is to provide at least one longitudinally extending plunger groove in the land in order to more gradually vary the pressure as the plunger is moved.

While these and other devices dealing with the peripheral leading edge of the lands disclosed in the prior art have been somewhat effective to reduce the detrimental imbalances which retard ease of operation and precise control, they have not been entirely satisfactory. Their effectiveness is reduced by the fact that regardless of how many metering points they provide, there is a condition at cut-off where the combination of flow and pressure can still develop significant imbalances. Thus, while the prior art solutions have tended to mitigate the problem somewhat, there is much room for improvement.

SUMMARY OF THE INVENTION

From the above it is evident that there exists a need in the art for a control valve which reduces these imbalances to an extent greater than has heretofore been accomplished, and thus create a more controllable and more easily operable valve. It is a purpose of this invention to fulfill this need in the art as well as other needs which will become apparent to the skilled artisan given the following detailed disclosure.

This invention improves over the prior art devices by providing certain means immediately adjacent to the leading edge of either the plunger land or static land of the housing bore, which means reduce the static and dynamic imbalances in a much more efficient manner than heretofore accomplished. Such means as contemplated by this invention generally comprise, in contradistinction to the longitudinal manipulations of the prior art, groove means extending in a circumferential direction about the peripheral surface adjacent to the leading edge of the plunger lands and/or static lands. Such groove means are usually defined by at least one peak and valley. In certain preferred embodiments a plurality of peaks each axially spaced from the other by a valley therebetween are provided such that the peaks are located substantially one behind the other as they progress away from the leading edge of the land. In further, and particularly preferred embodiments, the groove means are formed such that the outside diameter of the land is smaller at the point farthest from the leading edge and flares outwardly therefrom to the outside sealing diameter at the leading edge. In still further preferred embodiments the groove means are screw threads such that there is provided one continuous valley between the peaks.

The above described groove means as contemplated by this invention have proven effective in adding increased control and/or ease of manipulation to the operation of the valves in which they are employed. The exact mechanism by which this increased control and ease of operation is achieved is not entirely understood. It is believed, however, that these desired results are achieved, at least in part, by the creation of a high degree of turbulence in and about the ever-narrowing orifice as the plunger approaches its cut-off position. This is in marked contrast to the prior art which provides longitudinal or flat portions that create little if any turbulence. It is further believed that this turbulence is a prime factor in mitigating or reducing the detrimental kinetic energy effects of increased high velocity due to the constricting orifice. For example, it is believed to mitigate the mass impingement of high velocity fluid on the plunger. Thus, the turbulence created by the groove means of this invention converts kinetic energy to potential energy and thus increases control and ease of operation.

It is still further believed that in the more sophisticated forms of this invention such as by the presentation of a plurality of groove means, turbulence is increased in a staged fashion so as to better linearize the system thus to give an even greater degree of control. And this appears to be especially true when the staged groove means are bevelled (in a way hereinafter explained) so as to maximize turbulence, delay the cut-off point, and thus minimize the kinetic energy effect created by increased velocities.

In still more sophisticated embodiments, such as where a screw thread is provided either in bevelled or unbevelled form, it is believed that an additional control dimension is built into the system since the screw thread contains but a single valley between the crowns. This single valley, then, creates a secondary avenue of flow which, by its nature, is believed to achieve two important effects: (1) it tends to linearize reduction of pressure across the constricting orifice and (2) it, at least partially, changes the direction of the component of velocity so as to further mitigate increasing velocity effects.

Thus, stated another way, this invention contemplates the employment of means in a valve of the type described, which means are capable of creating turbulence and thereby reducing the effect upon control and/or ease of operation of high velocity which occurs as the land approaches its cut-off point in the valve. In a more sophisticated form the means contemplated are capable of creating turbulence and linearizing pressure in stages as cut-off approaches. In still more sophisticated forms, the means are capable of providing a second avenue of flow and/or at least partially changing the direction of the component of velocity.

Not only do the groove means of this invention reduce imbalances with more efficiency than those generally disclosed in the prior art, but such groove means do not entail the use of complex longitudinal grooves, drill holes, undercuts, and the like. Thus, they are easily manufactured, and economically employed, in comparison to the relatively complex means of some of the prior art.

This invention will now be described with respect to certain embodiments in combination with the attached illustrations.

DETAILED DESCRIPTION OF THE PREFERRED EMBODIMENTS

Figure 1:
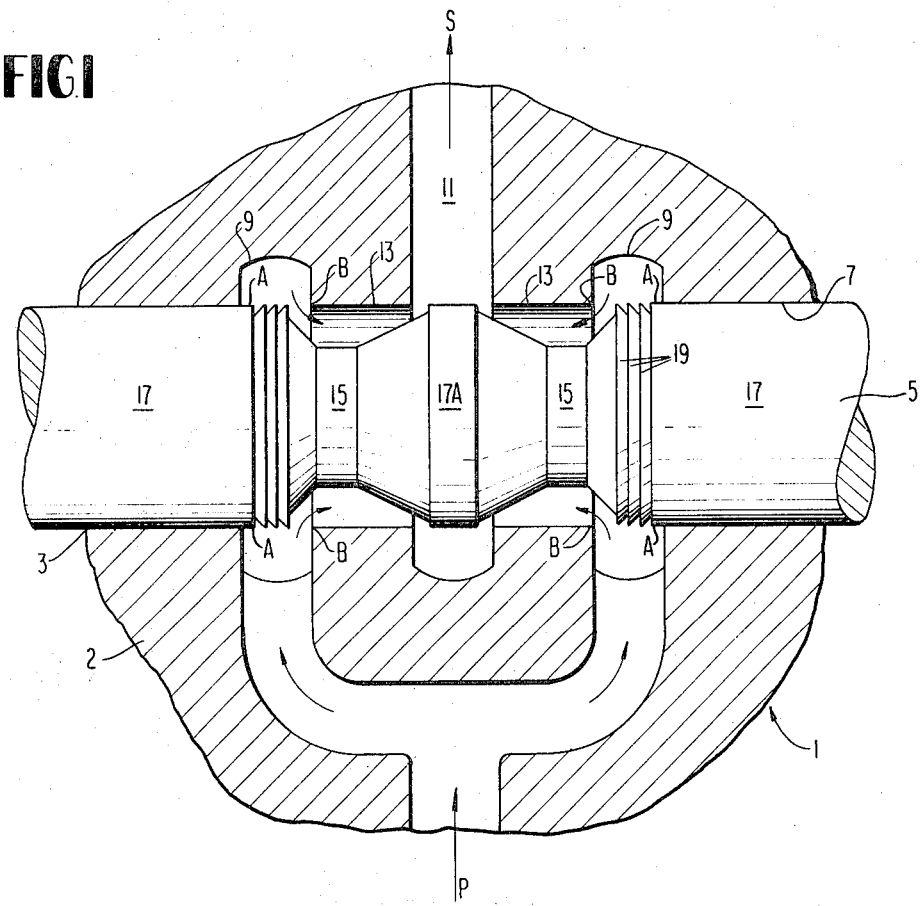
FIG. 1 is a partially sectionalized side plan view of a spool or plunger employed in a typical hydraulic control valve in accordance with this invention.

Referring to FIG. 1, there is illustrated a typical internal portion of a hydraulic control valve generally designated at 1. Such valves usually comprise a housing 2 having a cylindrical bore 3 through which a flow control spool or plunger 5 is presented. Spool or plunger 5 slidably but sealingly engages the internal bore walls 7 so as to provide, through its movement, a control valve for hydraulic fluid flowing through housing 2. This is best illustrated in FIG. 1 by reference to the arrows wherein hydraulic fluid enters at P and flows upwardly through various cores, eventually terminating at conduit S. Conduit S leads, in a conventional fashion, either to sump (reservoir) for repressurization or to another valve or the like.

The inner walls 7 of bore 3 are provided with a plurality of cores 9 which are generally bore encircling grooves in wall 7. The number of cores will be governed by the type valve, the work to be accomplished, and the like, all of which is conventional in the art. There are a plurality of such cores 9 axially spaced along walls 7 on either side of sump conduit 11. Such cores 9 and sump conduit 11, have located therebetween static lands 13 so as to form a predetermined land-groove configuration in housing 2.

Similarly as inner wall 7 of bore 3 is provided with a land-groove configuration, so is spool 5. This is conventionally accomplished by providing circumferential groove portions 15 axially spaced from one another along the longitudinal length of spool 5. Groove portions 15, which may be in a multitude of different configurations, thereby define between them a plurality of spool lands 17.

Where this valve arrangement is used, for example, to drive a reciprocating piston (not shown), certain of the axially spaced cores 9 are connected to sump while others (not shown) are motor ports connected to one or the other side of the piston. When spool 5 is moved in bore 3, various cores 9 align with grooves 15 to define avenues of flow for the hydraulic fluid while the various plunger lands 17 converge with their corresponding static lands 13 to cut off other defined avenues of flow. This, in turn, causes the piston to perform its desired task.

Valve 1, if connected to a reciprocating piston device, is shown in what is commonly referred to as its "neutral" or "hold" position wherein hydraulic fluid entering at P freely flows through cores 9 and outwardly through sump conduit 11. Conventionally, this would also usually mean that the next adjacent core 9 (not shown and axially spaced from those which are shown) connected to motor ports, would be closed by aligned spool land 17 that has passed the cut-off point for that port, and thus to hold the piston in place.

As spool 5 is moved either to the right or to the left by a manual or automatic operation external to the valve, the leading edges A of one of the lands 17 is caused to close upon a corresponding leading edge B of static land 13. This causes a constriction of the orifice through which the hydraulic fluid is allowed to flow, thereby pressurizing the fluid delivered by the pump and thus creating the static and dynamic imbalances as described above so detrimental to control and easy operation of the valve.

In accordance with this invention, and in order to efficiently reduce these imbalances, there is provided adjacent the leading edge A of lands 17, groove means 19 which, as shown, extend circumferentially about the peripheral edge or surface of lands 17. In FIG. 1, the grooves 17 comprise three staged grooves machined adjacent the leading edge A of land 17, extending forwardly thereof, and constituting a series of valleys and peaks of the desired magnitude. It has been found, as described above, that by providing such groove means the imbalances of flow are significantly reduced due to the creation of turbulence, and other reducing effects as the fluid flows over these peaks and valleys.

Figure 2:
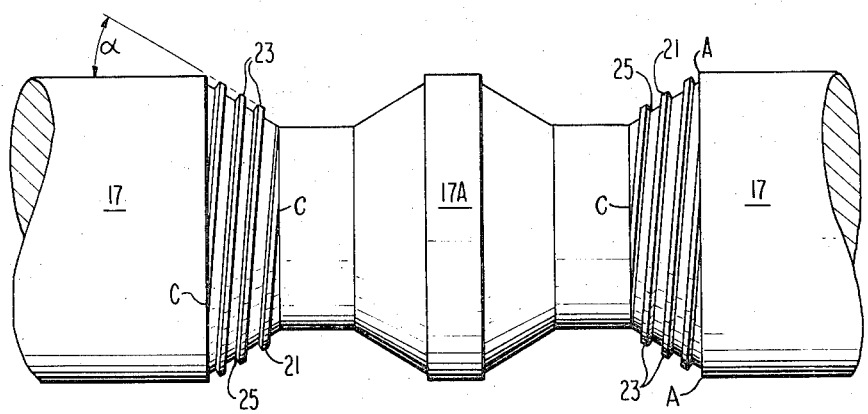
FIG. 2 is a side perspective view of another embodiment of this invention employable in the valve of FIG. 1.

Referring now to FIG. 2, there is illustrated a further embodiment of the groove means of this invention. Generally speaking, groove means 21 consist of screw threads machined into the leading edge A of lands 17 so as to provide peaks 23 and a single continuous valley 25 extending from leading edge A forwardly to point C, i.e. the point at which the screw threads end. In addition to providing peaks 23, and continuous valley 25, these screw threads, as illustrated, are preferably bevelled at an angle $\alpha$ from the horizontal such that the outside diameter of land 17 constantly decreases forwardly from leading edge A. Stated another way, the screw threads increase in diameter as they progress rearwardly from point C, thus to form an inwardly acute angle $\alpha$ with the plane of the periphery of said land. Angle $\alpha$ may be provided by sloping both the root and crown of the thread, or by maintaining the root at a constant diameter and making the thread crown of increasing height as it progresses toward the lead edge A.

This screw thread arrangement has many advantages. Firstly, it provides a staged circumferentially running groove means similar to the embodiment of FIG. 1. In addition, it forms a continuous rearwardly extending valley 25 which, in operation, performs in a manner similar to the longitudinal grooves of the prior art in that by providing a continuous rearwardly extending secondary channel of flow, pressure reduction is linearized. Furthermore, this continuous valley serves to change the direction of flow of the fluid travelling through it and thus to at least partially change the velocity vector as described above. This adds an additional control dimension to the system. Bevelling, as described above, adds a further dimension of control. And this is true regardless of whether or not the groove means are screw threads. Furthermore, the screw thread is relatively easy to machine especially into the highly accurately manufactured spool 5 without causing any substantial damage to the critical sealing surfaces of the remainder of the lands 17 which must seat accurately in bore 3.

The spools of plungers employed in accordance with this invention may, of course, assume many configurations and be used in a wide variety of fluid flow control valves, all of which are generally contemplated for the purposes of this invention. That is to say, this invention may be employed in any valve wherein the above-described problems are experienced due to the closing off of an orifice through the bringing together of a static and a spool land.

This invention also contemplates that the groove means may be employed along the leading edge B of the static land rather than in the leading edge of spool 5. In addition, the groove means may be employed in both of the leading edges (A and B). For most valves, however, it has been found that the groove means of this invention need only be provided in one of the leading edges A or B. Since it is usually simpler to form the groove means in the spool rather than in the leading edge of the static land, the leading edge A of spool 5 constitutes the preferred location for the groove means of this invention.

Referring once more to FIGS. 1 and 2, it has generally been found unnecessary to employ the groove means in land 17A, but such could be done if found desirable or necessary in other embodiments.

The actual dimensions of the grooves and their overall size in relation to the valve are not critical in the sense that they will vary as various situations are encountered. In this respect, routine experimentation will provide the necessary knowledge to adapt the teachings of this invention to any particular fluid flow control valve system as contemplated by this invention. Similarly, the angle $\alpha$ employed may be varied over a wide range depending upon the situation encountered. This too may be readily determined by routine experimentation so as to optimize the effects of this invention in any particular valve in which it is employed. Generally speaking the angle $\alpha$ is determined so as to shape the gain curve to a desired operation.

By way of illustration, and as exemplary of the type of dimensions which may be employed in a typical valve arrangement in accordance with this invention, the plunger illustrated in FIG. 2 may be employed as a float plunger in a mobile valve such as a V37DF (double float) valve as produced by the Hydreco Unit of General Signal Corp. Such a valve is commonly employed to supply pressure to the ends of a double acting cylinder such as is used in heavy earth moving equipment (e.g. front end loaders and the like). A typical set of dimensions for such a valve which generally comprises two center by-pass grooves and two sets of holes on either side of the cylinder port and balance grooves to provide for hydrostatic balance, are:

1. Length of spool - 9¾ inches
2. Length of first lands - approximately 1 inch
3. Angle $\alpha$ - approximately 6°
4. Axial length of screw thread - approximately ⅛ – ¼ inch
5. Diameter of plunger - 1¼ inches It has been found through actual testing that such a valve is easy to operate, may be accurately operated, and exhibits a moderately staged, generally linear flow force pattern as determined by an x-y plot of plunger forces vs. plunger displacement for both working and blocked cylinder.

It has further been found that when the teachings of this invention are employed, in most instances the need for power boosts is either completely eliminated or greatly mitigated.

Once given the above disclosure, many other features, modifications, and improvements will become apparent to the skilled artisan. Such other features, modifications and improvements are therefore considered to be a part of this invention, the scope of which is to be determined by the following claims.

I claim:

1. In a fluid flow control valve comprising a bore having sealingly but slidably located therein a plunger, and wherein said bore portion has located within its walls at least one fluid flow port which defines at least one static land having a static leading edge and wherein the peripheral surface of said plunger communicates with said walls and has located therein at least one groove portion which defines at least one plunger land having a leading edge such that (1) said groove portion is capable of being aligned by sliding movement of said plunger in said bore with said fluid flow port so as to form an avenue of fluid flow and (2) said fluid flow port is capable of being isolated from fluid flow by sliding movement of said plunger in said bore to cause said leading edge of the plunger land to communicate with said static leading edge of said static port land, the improvement comprising groove means of sufficient magnitude for significantly increasing the ease and accuracy of moving the plunger as said plunger approaches that point at which said leading edge of the plunger land communicates with said static leading edge of said static port land thereby to isolate said fluid flow port from fluid flow, said groove means being located adjacent to the leading edge of the static land or the plunger land, or both.

2. The valve of claim 1 wherein said groove means is in the plunger land and decreases in diameter as it progresses away from said leading edge.

3. A valve according to claim 2 wherein said groove means is a screwthread.

4. A valve according to claim 1 wherein said groove means is a screwthread.

5. A valve according to claim 1 wherein said groove means is capable of creating turbulence and linearizing pressure in stages as the leading edge of said plunger land approaches its cut-off point.

6. A valve according to claim 1 wherein said groove means comprises a screwthread with one substantially continuous valley and a plurality of threads, said groove means decreasing in diameter as it progresses away from said leading edge, thus to form an inwardly acute angle with the plane of the periphery of said plunger land.

7. A valve according to claim 6 wherein said angle is about 6°.

8. A valve according to claim 1 wherein said plunger includes a plurality of lands and said valve is a hydraulic control valve.

* * * * *